United States Patent [19]

Krambrock

[11] Patent Number: 4,599,015

[45] Date of Patent: Jul. 8, 1986

[54] DEVICE FOR DOSING LOOSE MATERIAL

[75] Inventor: Wolfgang Krambrock, Aichenwiesen 18, D-7981 Vogt, Fed. Rep. of Germany

[73] Assignee: Wolfgang Krambrock, Vogt, Fed. Rep. of Germany

[21] Appl. No.: 639,953

[22] Filed: Aug. 10, 1984

[30] Foreign Application Priority Data

Aug. 12, 1983 [DE] Fed. Rep. of Germany ....... 3329299

[51] Int. Cl.[4] .............................................. B65G 53/46
[52] U.S. Cl. ..................... 406/66; 222/148; 384/483
[58] Field of Search ............... 406/66, 68; 222/148, 222/216; 277/64, 110, 105, DIG. 1, DIG. 5; 384/130, 134, 149, 150, 477, 478, 483

[56] References Cited

U.S. PATENT DOCUMENTS

| 1,015,884 | 1/1912 | Haaser | 277/64 |
| 1,568,139 | 1/1926 | Dewey | 406/66 |
| 1,574,211 | 2/1926 | Taylor | 384/483 |
| 1,772,290 | 8/1930 | Rosencrants | 406/66 |
| 2,299,119 | 10/1942 | Yeomans | 384/130 |
| 2,599,304 | 6/1952 | Weber | 406/66 |
| 2,637,539 | 5/1953 | Crom | 406/66 X |

Primary Examiner—Jeffrey V. Nase
Attorney, Agent, or Firm—Murray Schaffer

[57] ABSTRACT

A cylindrical housing is arranged with its central axis in a vertical direction and has a feed opening for the supply of loose material at its upper end, a wall closing at its bottom end, and a discharge outlet extending radially through its perimetrical wall. A bucket wheel is located in the housing rotatable about the vertical axis. An inlet duct for the introduction of clearing air extends axially through the bottom end of its housing below said discharge outlet, and a horizontally displaced baffle plate is located above said discharge outlet.

10 Claims, 11 Drawing Figures

DEVICE FOR DOSING LOOSE MATERIAL

BACKGROUND OF THE INVENTION

The present invention relates to apparatus for feeding loose materials from a storage container into pneumatic conveyors and in particular to a dossimeter for feeding loose granulate materials into pneumatic conveyor conduits.

Apparatus enabling the feeding of loose material continually from a storage chamber such as a silo, subjected to any desired pressure, into a pneumatic conveyor conduit having therein a higher or lower prevailing pressure are generally known under the appellation of "bucket wheel locks". Such apparatus comprises a housing in which a bucket wheel having a hub fixed on a horizontal shaft is rotably journalled in the housing. The wheel has a plurality of radially extending wings or blades which define wedge shaped or trapezoidal chambers or buckets. Loose granular material is fed to the housing through an upper inlet opening where it falls onto each of the buckets successively and from which, after a rotation of approximately 180 degrees it is transferred via an oulet opening into the pneumatic conveyor conduit. If necessary, the transfer of the loose material into the conveyor conduit is assisted by the use of compressed air.

The amount of loose material dosed in this manner increases at first, with the rising speed of the bucket wheel, but decreases again with an additional increase of speed thereof. This is caused by the centrifical forces acting upon the bucket wheel and the loose material. The maximum amount of loose material dosed in any given time period is achieved at a bucket wheel speed of approximately 20-40 rpm.

An additional disadvantage occurs if a higher pressure prevails in the receiving pneumatic conveyor conduit than at the inlet opening of the bucket wheel lock. Since the design must insure rotation of the bucket wheel in the housing, the space between the bucket wheel itself and the housing, causes the air flowing from the high pressure conveyor conduit to run in the opposite direction to that of the falling loose material, preventing the complete filling of the bucket wheel chambers. This is a particularly troublesome fact when fine grained loose material is being transferred. Finally, problems are also encountered with viscous, sticky, and randomly sized "bridge-building" particulate loose materially. Because of the relatively narrow inlet sections required for the construction of such apparatus, such materials act to interrupt the continuous filling of the bucket wheel chambers.

It was also known to mount the bucket wheel so as to be rotatable about a vertical axis. The loose material is fed into the housing via an eccentric opening, which corresponds approximately to the cross-section of the buckets, and after being further transported approximately 180 degrees, is blown out of the bucket wheel chamber through an axial opening into the conveyor conduit. A burst of clear air is used to assist the discharge, the mouth of the clearing air duct being located exactly axially to the outlet. A disadvantage of this construction resides in the fact that the narrow cross-section of the inlet prevents a continuous flow of the loose material to be dosed and even makes such a continuous flow impossible when cohesive and sticky loose materials are transported.

It is an object of the present invention to provide apparatus of the type described which permits a high dosage rate even for viscous, sticky, loose materials.

These objects together with other objects and advantages will be apparent from the following disclosure.

SUMMARY OF THE INVENTION

In accordance with the present invention the foregoing objects are obtained by providing bucket wheel lock with an infeed opening which is approximately equal to the upper face of the housing and that the discharge outlet to the conveyor conduit branches off radially from the housing above the mouth of the clearing air duct. The discharge outlet is covered along the top of the housing and aligned with the mouth of the clearing air duct, by a plate which covers the top of the bucket wheel for a space of at least one chamber of the bucket wheel.

With this type of construction, neither centrifugal force, nor leakage of airflow which may exist in the apparatus, has a disadvantageous effect upon the filling of the bucket wheel chambers. In addition, the bucket wheel chambers are fed the loose material, over a large angle of rotation of the bucket wheel, due to the large cross section of the intake or infeed opening. This helps to achieve complete filling of the bucket wheel chambers since the large cross-section of the intake opening prevents arching or bridging formations in these areas even when viscous, sticky or large loose materials are transported.

When particularly viscous loose material is being used, it may be also expedient and even necessary, to provide agitator means which extend upwardly through the infeed opening in fixed connection and conjoint rotation with the bucket wheel. If the bucket wheels have a large diameter, a complete filling of the bucket wheel chambers can be promoted by providing the hub of the bucket wheel with the deflection cone at its center, so as to direct the material positively into the bucket chambers.

Furthermore, the present invention makes it possible to dose equal amounts of loose material to several conveyor conduits at the same time. This may be accomplished by providing the housing with several paired discharge outlets and inlets for clear air, distributed along the circumference thereof, each being provided with baffle plates covering the appropriate chambers.

In a further embodiment, the apparatus is provided with means for sealing the journaled drive shaft and central hub comprising an upper and lower set of gaskets which may be retightened with a pressure ring which is adjustable from the exterior.

It is frequently necessary to change within wide limits, the amount of loose material to be dosed into the conveyor conduit, per unit of time. For this purpose, rather than employing a drive for the bucket wheel of infinitely variable rotationable speed, as is common in the prior art, the present invention enables the regulation of the throughput in an inexpensive manner by providing that the clear air duct be connected with the, or any desired, conveyor conduit via a bypass line and at least one of the lines contains a valve for adjusting the amount of air which floats through the bypass line. The valve employed for the bypass is preferably a three-way valve which is disposed either in the clearing air duct or the conveyor conduit.

Full details of the present invention are set forth in the following description and are shown in the accompanying drawings.

DESCRIPTION OF THE INVENTION

Figure 1:
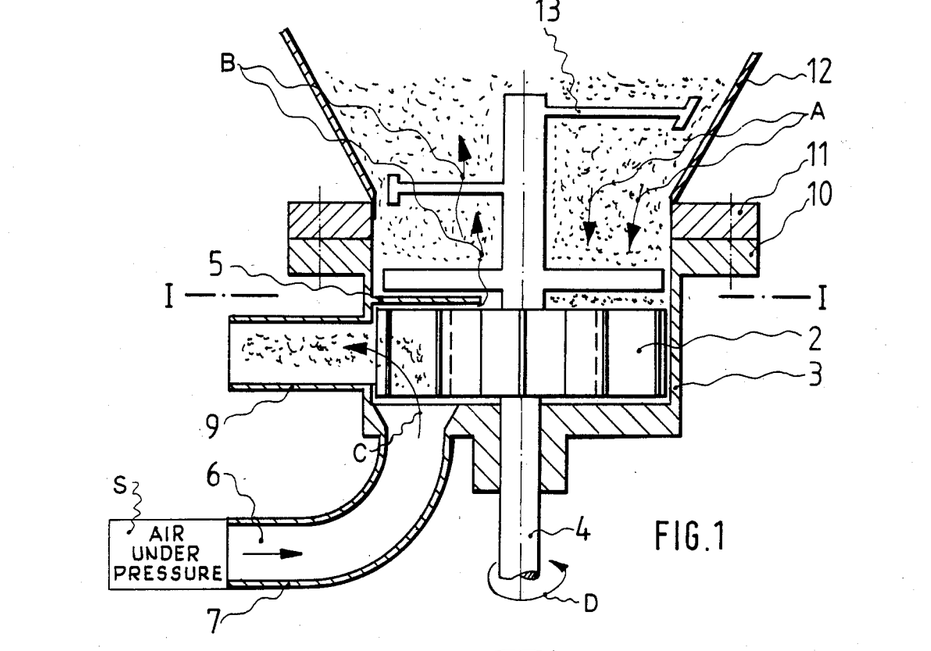
FIG. 1 is a longitudinal section through a dossimeter embodying the present invention.
Figure 2:
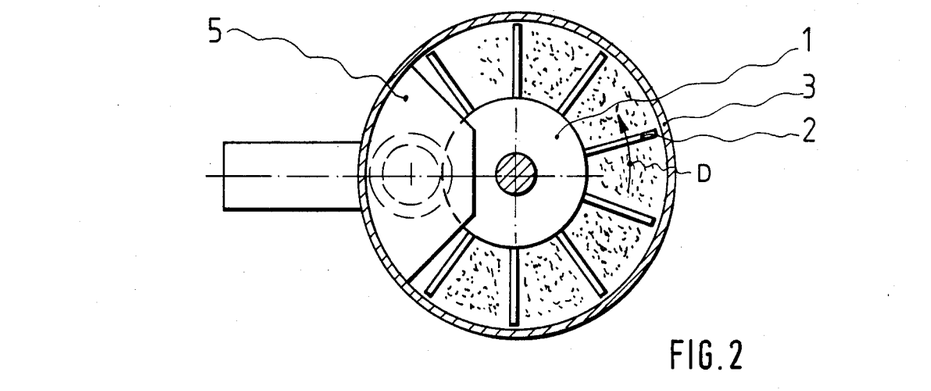
FIG. 2 is a sectional plan view taken along line I—I of FIG. 1.

As seen in FIGS. 1 and 2 the bucket wheel comprises a hub 1 fixed upon a vertical drive shaft 4 suitably connected so as to be driven in the direction of arrow D by an electrical motor or the like. A plurality of blades 2 extending radially from the wall of the hub 1. The bucket wheel is surrounded by a cylindrical housing 3 having an open top end and a bottom wall. The bottom wall and the perimeter wall define with the blades a plurality of discrete pre-shaped bucket chambers. The housing 3, at its upper end, is provided with a radially extending flange 10 which is bolted to a counter flange 11 along the periphery of a bottom outlet of a storage container such as a silo or funnel 12. The housing 3 is provided with a horizontal baffle in the form of a plate 5 of circular section, which extends only over a portion of the bucket wheel somewhat greater than a single bucket chamber but not greater than about one quarter of the circumference of the bucket wheel. The remainder of the top of the housing 3 consisting of at least a plurality, if not a majority of the bucket chambers is left open and functions as an inlet opening through which the loose material, falling by gravity, from the silo 12, following the arrows A.

The housing 3 is provided with a flow from a source 5 of clear air 6 via a clear air duct 7 which opens into the bottom wall of the housing 3 in line with the plate 5. A discharge outlet 9 extends radially outward from the perimeter wall of the housing 3, between (i.e. axially in line with) the plate 5 and the clear air duct 7. The discharge outlet is adapted to be connected to a pneumatic conveyor conduit, pipe, or the like.

An agitator 13 is fixedly connected to the bucket wheel for conjoint rotation, as being fixed directly to the shaft 4 or to the hub 1. The agitator 13 extends upwardly into the silo 12 so that it will agitate the falling particulate matter preventing bridging or other obstruction of the feed opening.

In operation, the material falls freely through the rather large feed opening, insuring the complete filling of each chamber, before it rotates out of the range of the incoming material. The chambers remain filled until they individually reach the discharge outlet where the clear air augments the force created in the pneumatic conduit attached to the discharge outlet, as seen by the flow arrow C. The top baffle plate, not only limits air leakage, but prevents the material from leaving the chamber in an axial direction, as result of the clearing air, and cooperates to direct the flow of all of the material outward into the discharge outlet, so that when the chamber moves away from the discharge outlet it is completely empty.

This type of design or construction makes it possible to have a feed opening cross-section of almost any desired size, thus counteracting bridge formation or arching of the loose material in a narrow inlet. Consequently, with the present invention the agitator 13 can be dispensed with for most types of loose material.

Likewise, leakage flow which would normally occur when there is higher pressure in the clearing air duct 7 than in the storage chamber does not impede the flow of the loose material, since whatever leakage flow does occur, it is confined approximately to the direction shown by arrows B, i.e. between shaft 4 and the plate 5, flowing on the radially opposite side of bucket wheel to where the incoming loose material arrow A, flows downwardly into the bucket wheel chambers.

Even at high rotational speed of the bucket wheel, the flow of the loose material is not impeded as a result of the centrifugal force. On the contrary, centrifugal force has no adverse effect on the material being fed to the bucket wheel but does, on the other hand, assist in the discharge of the loose material due to the fact that the loose material is accelerated in the direction of discharge outlet 9. Measurements have shown that in a bucket wheel lock, formed in accord with the present invention, having a diameter of 300 mm and operated at a rotational speed of 50 rpm, a volumetric efficiency of the bucket wheel chambers in excess of 50 percent was still be obtained. Under comparable circumstances, the volumetric efficiency of a similarly sized bucket wheel lock having a horizontal axis, amounts to a mere 20 percent.

Figure 3:
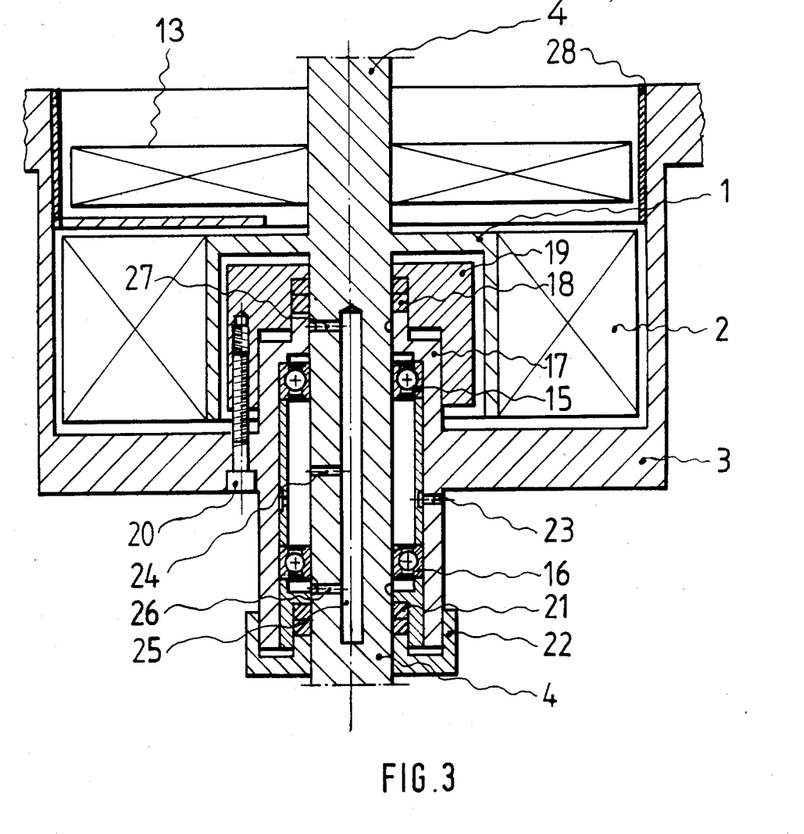
FIG. 3 is a sectional view taken in the plane passing through the central axis of the bucket wheel shown in FIG. 1.

FIG. 3 shows an expedient embodiment for journalling the bearings for the vertical shaft 4 relative to the housing. The shaft is journalled in two ball bearings 15 and 16 which are disposed at an axial distance from each other in the inner hub sleeve of the housing. In order to prevent dust from entering the bearings, gaskets 18 and/or 21, are provided about the drive shaft 4 above the ball bearing 15 and below the ball bearing 16. Furthermore, scavenging air may be supplied from a suitable source of compressed air to the bearings via compressed air ducts 23 to 27.

Neither the gasket 18 or the gasket 21 is prestressed. In order to place the gasket 18 under pressure from the exterior, the hub 1 of the bucket wheel is hollowed receiving therein a thrust collar 19 which sits on the gasket 18. The collar 19 forces the gasket 18 against a frontal end of a shoulder 17 located on the inner hub sleeve of the housing 3. The thrust collar 19 is secured to the housing 3, by one or more screws or bolts 20 which are adjustable to tighten the gasket 18. Simultaneously, the lower gasket 19 is held and pressed in place by a second thrust collar 22 which is formed as a screw cap threaded on to the exterior of the hub sleeve of the housing 3. Thus, both thrust collars 19 and 22 are easily removable in order to replace the gaskets 18 and 21 but most importantly are easily tightened to re-stress the gaskets 18 and 21.

Figure 4:
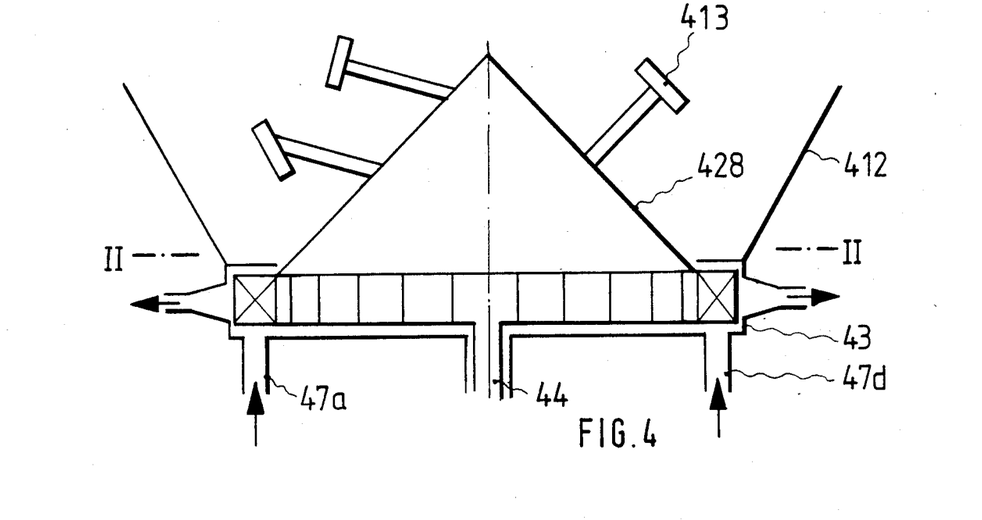
FIG. 4 is a scematic lateral view showing the apparatus of the present invention employed for supplying several conveyor conduits.
Figure 5:
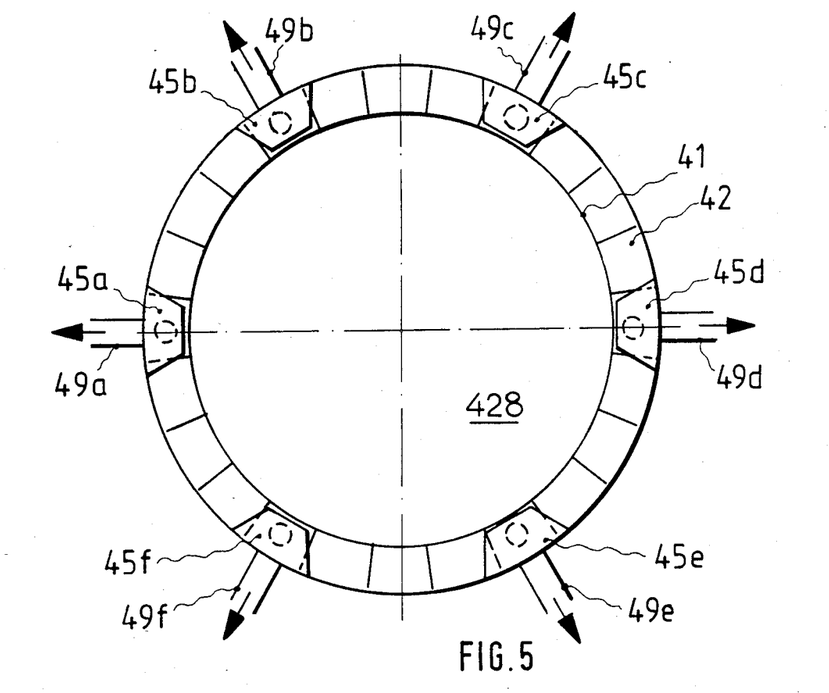
FIG. 5 is a top plan view of the apparatus shown in FIG. 4.

FIGS. 4 and 5 illustrate schematically an embodiment which can supply several consuming devices with more or less equal doses of loose material. This is useful, for example, in the distribution of coal dust to several burners of a coal furnace. For this purpose, the device mounted by its flange 10 onto the funnel outlet of a silo 412 comprises a housing and bucket wheel of large overall diameter having a hub 41 of relatively large diambeter and short blades 42. The central hub 41 is covered by a conical deflection hood 428 which urges the material toward the perimeter and which is provided with agitating members 413 extending randomly outward from its surface. Distributed uniformly along the perimeter wall are a plurality (six being shown) of discharge outlets 49a to 49f, beneath each of which air is delivered via ducts 47a to 47f. An equal number of top baffle plates 45a to 45f are attached in corresponding places above the discharge outlets of the bucket wheel. The arrangement need not be uniform about the periphery, and may be asymetrical. Operatively, the infeed of loose material is made over a large area and a number of bucket chambers, while the counter clearing air flow is maintained localized about each of the discharge outlets, as in the earlier embodiments.

Figure 6:
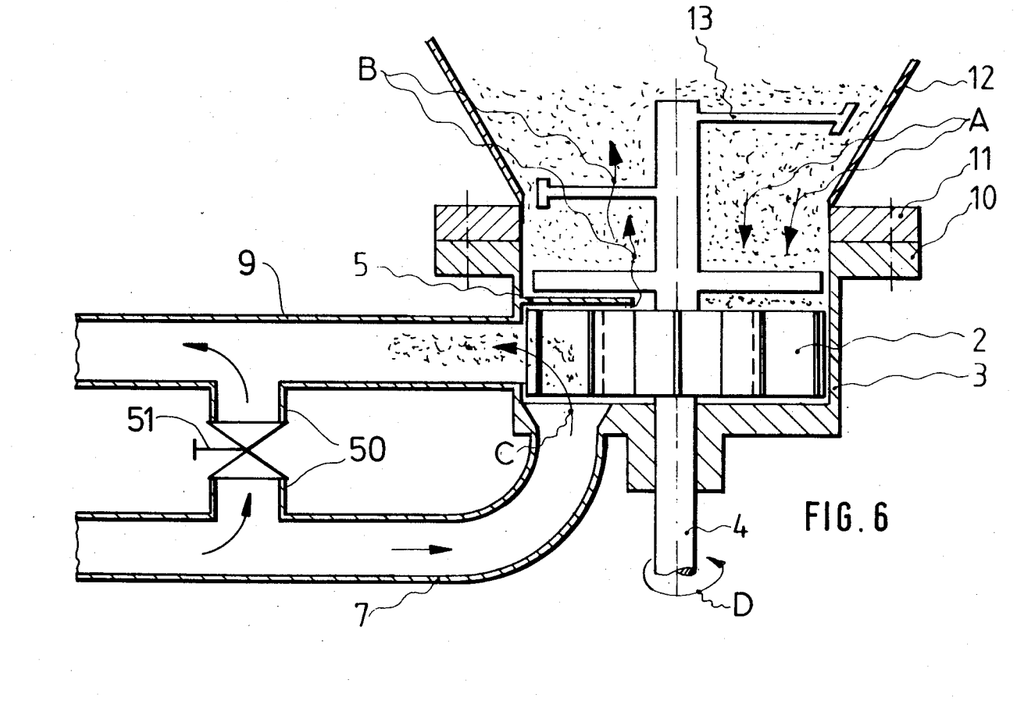
FIG. 6 is a view similar to FIG. 1 showing further embodiment of the present invention, including means for regulating the throughput thereof.

FIG. 6 shows an embodiment where the clear air inlet duct 7 is connected with the discharge conveyor conduit 9, via a by-pass line 50 which contains a butterfly valve 51. While the remainder of the device is the same structurally and functionally to the embodiment of FIG. 1, it is possible that at a constant rotational driving speed of the bucket wheel the amount of loose material distibuted to the conveyor conduit 9 can be greatly varied. This is accomplished by adjusting the position of the butterfly valve 51. In accordance with FIG. 7, an additional butterfly valve 52 can be provided in the clear air duct 7 downstream from the branch-off of the by-pass line 50. This permits an even more exact adjustment of the amount of air being distributed through the entire system.

Figure 7:
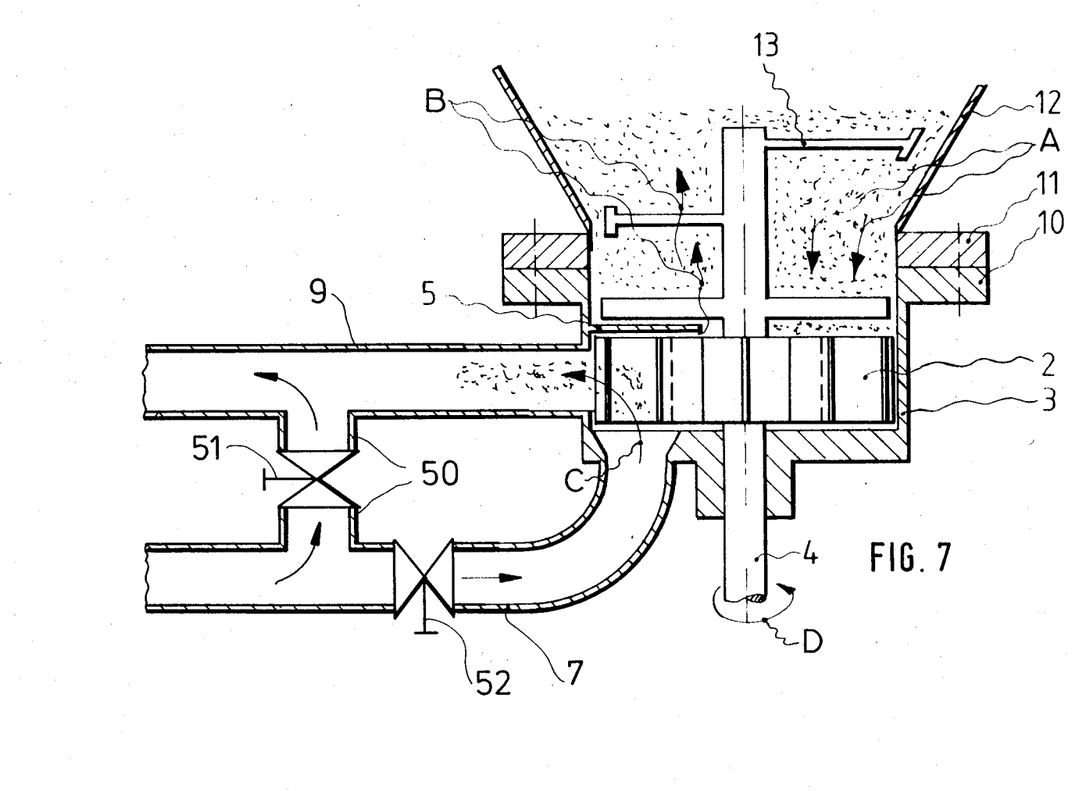
FIG. 7 is a view similar to FIG. 6 showing still a further embodiment of the regulating means.
Figure 8:
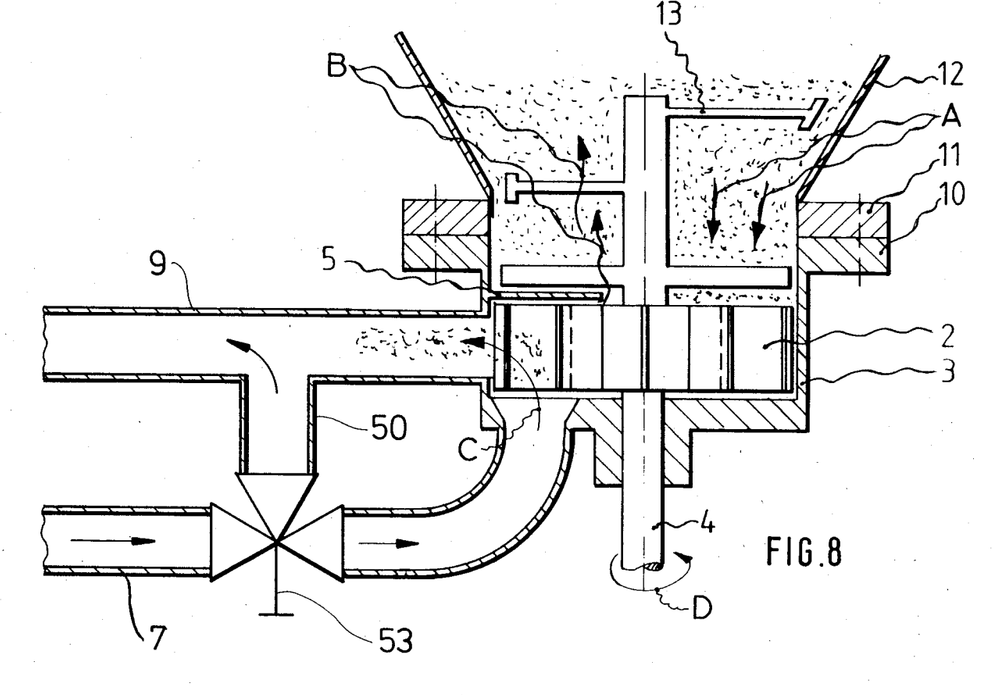
FIG. 8 is yet another view similar to FIG. 6 showing still a further embodiment of the throughput regulating means.
Figure 9:
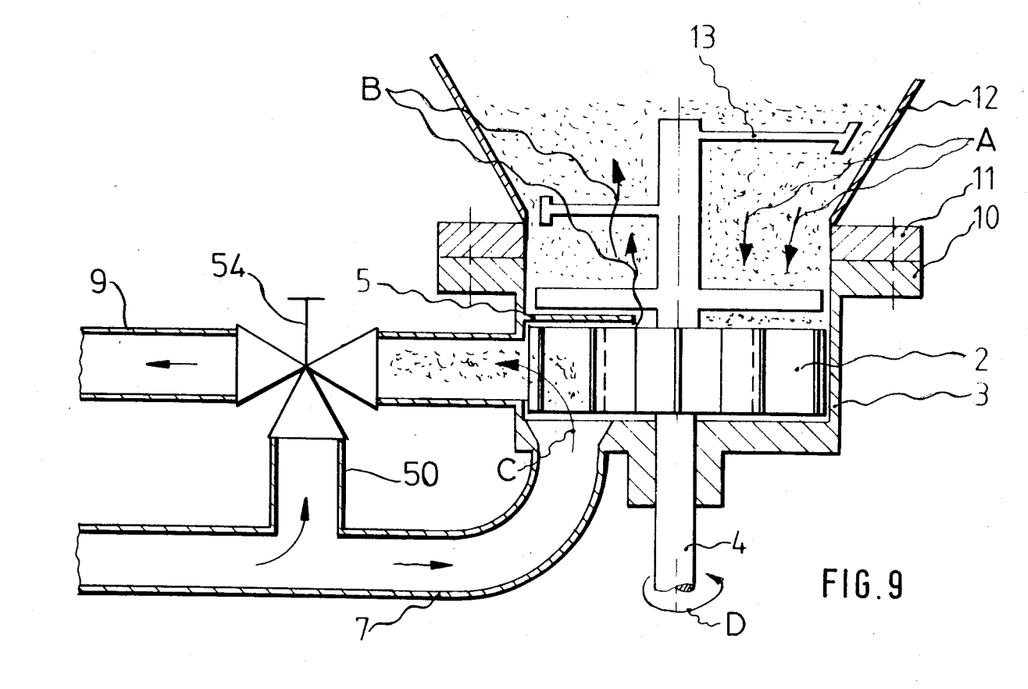
FIG. 9 is a view similar to that of FIG. 6 showing yet another embodiment of the throughput regulating means.

More practical than the use of two butterfly valves 51 and 52, as shown in FIG. 7, is the use of a three-way valve which can be arranged either according to FIG. 8, reference numeral 53, in the clear air duct 7 or as in FIG. 9 where the three-way valve 54 is shown placed in the conveyor conduit 9.

Figure 10:
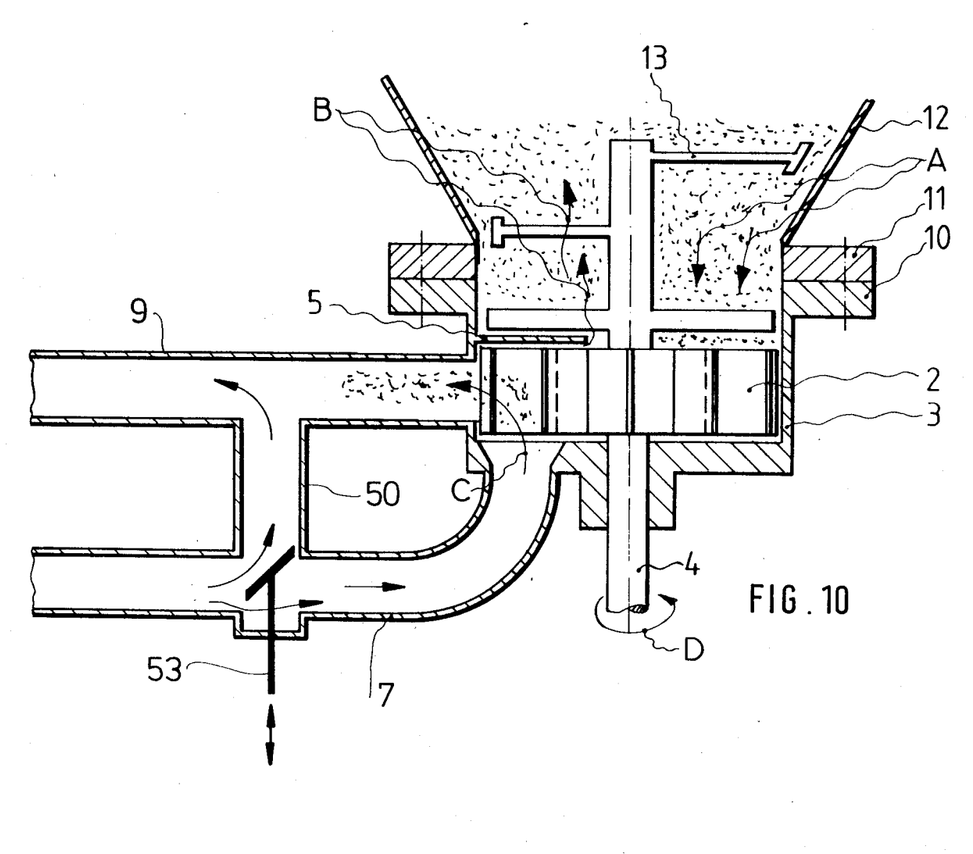
FIG. 10 is a view similar to FIG. 6 showing still a further view of another throughput regulating means.
Figure 11:
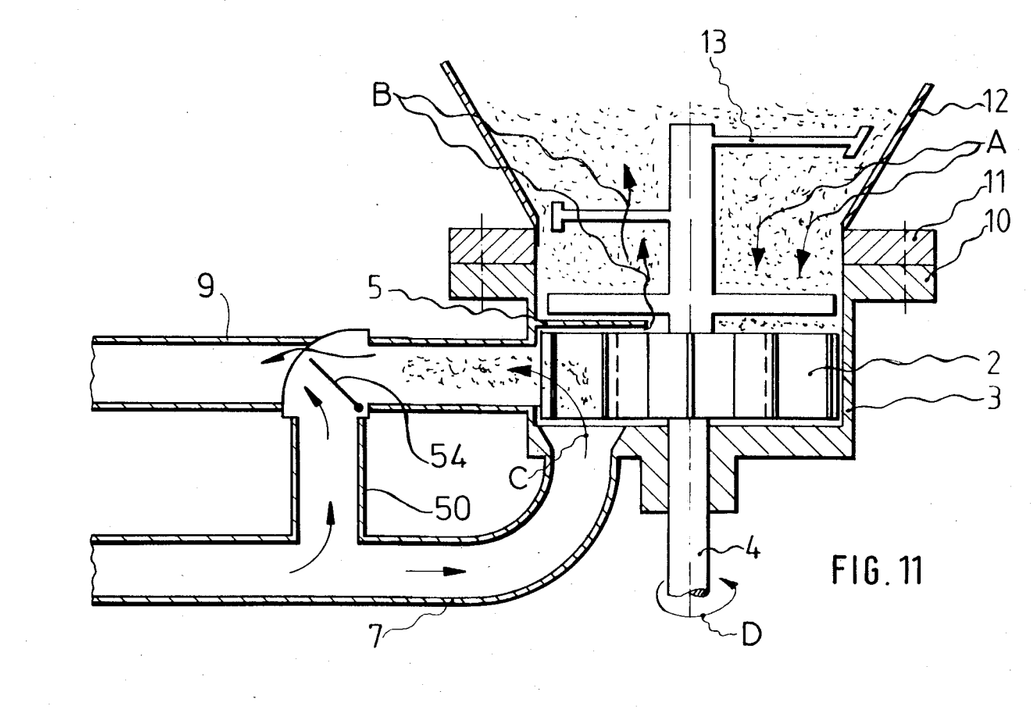
FIG. 11 is a view similar to FIG. 6 showing still another embodiment of the throughput regulating means.

FIG. 10 shows such a three-way valve 53, in form of a displaceable aperture. FIG. 11 shows an embodiment of a three-way valve 54, as a swiveling flap.

As illustrated in FIGS. 6 to 11, it is possible to regulate the continuous throughput of loose material by regulation and control of the clear air flow via one or more of the by-pass lines. This is particularly advantageous in the embodiment shown in FIGS. 4 and 5 since in addition to or in lieu of the throughput regulation via the rotational drive speed of the bucket wheel, it is possible, also to adjust and change independently of each other, the amounts of loose material dosed into individual conveyor conduits by regulation of the air flow through the various ducts 47a–47f. This may be required, for example, if the device is employed for the supply of a plurality of coal dust burners each operating at a different rate.

Various modifications and changes have been shown and suggested, and others will be apparent to those skilled in this art. Therefore, it is intended that the disclosure set forth herein not be taken as limiting of the invention.

What is claimed:

1. Apparatus for dosing loose material into at least one pneumatic conveyor conduit, comprising a cylindrical housing arranged with its central axis in a vertical direction, said housing having a feed opening for the supply of loose material at its upper end, a wall closing at its bottom end, and a discharge outlet extending radially through the perimetrical wall thereof, a bucket wheel located in said housing and rotatable about said vertical axis, said bucket wheel being formed by central hub and a plurality of radially extending blades defining a plurality of chambers, each adapted to be filled with loose material and rotatable into registry with the discharge outlet, an inlet duct extending through the wall closing at the bottom end of said housing below said discharge opening, said duct introducing air axially into said bucket wheel chamber in registry with said discharge outlet and perpendicularly to the flow of material through said discharge outlet and a horizontally disposed baffle plate located above said discharge outlet, said baffle plate having an area covering the top of said bucket wheel for a space of at least one chamber of said bucket wheel and enclosing the chamber in registry at said discharge opening to enhance the discharge of loose material therefrom in cooperation with said axially introduced clearing air.

2. The apparatus according to claim 1 wherein said feed opening is greater than one half the circle of said bucket wheel.

3. The apparatus according to claim 2 wherein said baffle plate is no larger than one fourth the circle of said bucket wheel.

4. The apparatus according to claim 1 including agitator means fixedly connected to said bucket wheel for conjoint rotation and extending upwardly above said feed opening into said housing.

5. The apparatus according to claim 1 including a conical deflection hood arranged over said hub to deflect said material toward the peripheral edge of said bucket wheel.

6. The apparatus according to claim 1 having a plurality of discharge outlets spaced about its perimeter, each discharge outlet having arranged in association therewith an inlet for air extending through the bottom wall of the housing and a baffle plate located above the discharge outlet.

7. The apparatus according to claim 1, including a by-pass conduit means connecting said air inlet duct and discharge outlet exterior of said bucket wheel at least one of said inlet duct, said discharge outlet and said by-pass conduit having valve means located therein for regulating the amount of air flowing through one or more of said inlet duct, dishcharge outlet and by-pass conduit.

8. The apparatus according to claim 7 wherein said valve means comprises a three-way valve located in one of said air inlet ducts and said discharge outlet.

9. Apparatus for dosing loose material into at least one pneumatic conveyor conduit, comprising a cylindrical housing arranged with its central axis in a vertical direction, said housing having a feed opening for the supply of loose material at its upper end, a wall closing at its bottom end, and a discharge outlet extending radially through the perimetrical wall thereof, a bucket wheel located in said housing and rotatable about said vertical axis, said bucket wheel being formed by central hub and a plurality of radially extending blades defining a plurality of chambers, an inlet duct for the intoduction of clearing air extending axially through the bottom end of said housing below said discharge outlet, and a horizontally displaced baffle plate located above said discharge outlet, said baffle plate having an area covering the top of said bucket wheel for a space of at least one chamber of said bucket wheel, including a vertical drive shaft extending through and fixedly connected to the hub of said bucket wheel, said drive shaft being journalled in a supporting sleeve by a pair of bearings spaced from each other, a first gasket located on said shaft above the upper bearing and sealing said upper bearing with respect to said sleeve and a second gasket located on said shaft below the lower bearing and sealing said lower bearing with respect to said sleeve, and scavenging means for cleaning said sleeve and bearings comprising a source of air under pressure and duct means extending through said sleeve and shaft permitting flow of said air under pressure.

10. The apparatus according to claim 9 wherein said gaskets are held by adjustable axial thrust collars, said collars being adjustable from the exterior to selectively tighten said gaskets.

* * * * *